US012559235B2

(12) United States Patent
Setterstrom et al.

(10) Patent No.: US 12,559,235 B2
(45) Date of Patent: Feb. 24, 2026

(54) CALIBRATION FOR WIRELESS CARGO DEVICE RELATIVE ORIENTATION

(71) Applicant: GOODRICH CORPORATION, Charlotte, NC (US)

(72) Inventors: Kevin Setterstrom, Jamestown, ND (US); Dustin P. Scheer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 242 days.

(21) Appl. No.: 18/334,148

(22) Filed: Jun. 13, 2023

(65) Prior Publication Data

US 2025/0026476 A1     Jan. 23, 2025

(51) Int. Cl.
B64D 9/00          (2006.01)
(52) U.S. Cl.
CPC .......... B64D 9/00 (2013.01); *B64D 2009/006* (2013.01)
(58) Field of Classification Search
CPC ........................... B64D 9/00; B64D 2009/006
See application file for complete search history.

(56) References Cited

U.S. PATENT DOCUMENTS

| | | | |
|---|---|---|---|
| 8,217,964 | B2 | 7/2012 | Laine et al. |
| 8,817,048 | B2 | 8/2014 | Kerr et al. |
| 8,928,696 | B1 | 1/2015 | Yang |
| 9,501,813 | B2 | 11/2016 | Tichauer et al. |
| 10,005,564 | B1 * | 6/2018 | Bhatia ....................... B64C 1/20 |
| 10,768,661 | B2 * | 9/2020 | Balasubramanian .. G01C 17/10 |
| 10,825,143 | B2 | 11/2020 | Balasubramanian et al. |
| 11,332,248 | B2 | 5/2022 | Balasubramanian et al. |
| 12,304,744 | B2 * | 5/2025 | Setterstrom ............ B65G 43/00 |
| 12,330,808 | B2 * | 6/2025 | Gil ......................... B64U 30/10 |
| 2019/0384356 | A1 | 12/2019 | Balasubramanian et al. |
| 2020/0102076 | A1 * | 4/2020 | Balasubramanian ....................... G06Q 10/0833 |
| 2020/0104785 | A1 * | 4/2020 | Ehrman .................. G01S 17/88 |
| 2020/0311873 | A1 * | 10/2020 | Balasubramanian .. G01C 23/00 |
| 2020/0361607 | A1 * | 11/2020 | Nayak ................. G06F 3/04883 |
| 2021/0316864 | A1 * | 10/2021 | Daw Perez ............. B64D 9/00 |

(Continued)

FOREIGN PATENT DOCUMENTS

| | | | | |
|---|---|---|---|---|
| DE | 102017130157 A1 * | 6/2019 | ............... | B64D 9/00 |
| EP | 3716023 A1 * | 9/2020 | ........... | G06F 1/1694 |

(Continued)

OTHER PUBLICATIONS

U.S. Appl. No. 17/537,130, filed Nov. 29, 2021 and entitled "Wireless Tracking and Ranging for Cargo Systems", 52 pages.

(Continued)

*Primary Examiner* — Christopher P Ellis
(74) *Attorney, Agent, or Firm* — SNELL & WILMER L.L.P.

(57)          ABSTRACT

A mobile cargo controller for a cargo handling system is provided. The mobile cargo controller includes at least one inertial measurement unit configured to: identify a true forward position of a cargo compartment in which the cargo handling system operates, determine an orientation of the mobile cargo controller, and, using the true forward position of the cargo compartment and the orientation of the mobile cargo controller, identify a frame of reference for the mobile cargo controller within the cargo compartment.

11 Claims, 14 Drawing Sheets

(56)                          References Cited

U.S. PATENT DOCUMENTS

| 2021/0319397 | A1 * | 10/2021 | Daw Perez | .............. | B64D 9/00 |
| 2023/0125388 | A1 * | 4/2023 | Setterstrom | ........... | B65G 43/00 |
| | | | | | 700/230 |

FOREIGN PATENT DOCUMENTS

| EP | 3650344 | B1 * | 4/2021 | ............. | B64D 9/003 |
| EP | 4089603 | A1 * | 11/2022 | .............. | B64D 9/00 |
| EP | 4140923 | A1 * | 3/2023 | ............. | B65G 67/00 |
| EP | 4534415 | A1 * | 4/2025 | ........... | B65G 1/1371 |

OTHER PUBLICATIONS

U.S. Appl. No. 18/119,116, filed Mar. 8, 2023 and entitled "Wireless Emergency Stop System for Cargo Applications", 52 pages.
U.S. Appl. No. 18/310,692, filed May 2, 2023 and entitled "Above-Floor Wire Routing for Aircraft Cargo Handling System", 32 pages.
European Patent Office, European Search Report dated Nov. 5, 2024 in Application No. 24181759.2.

* cited by examiner

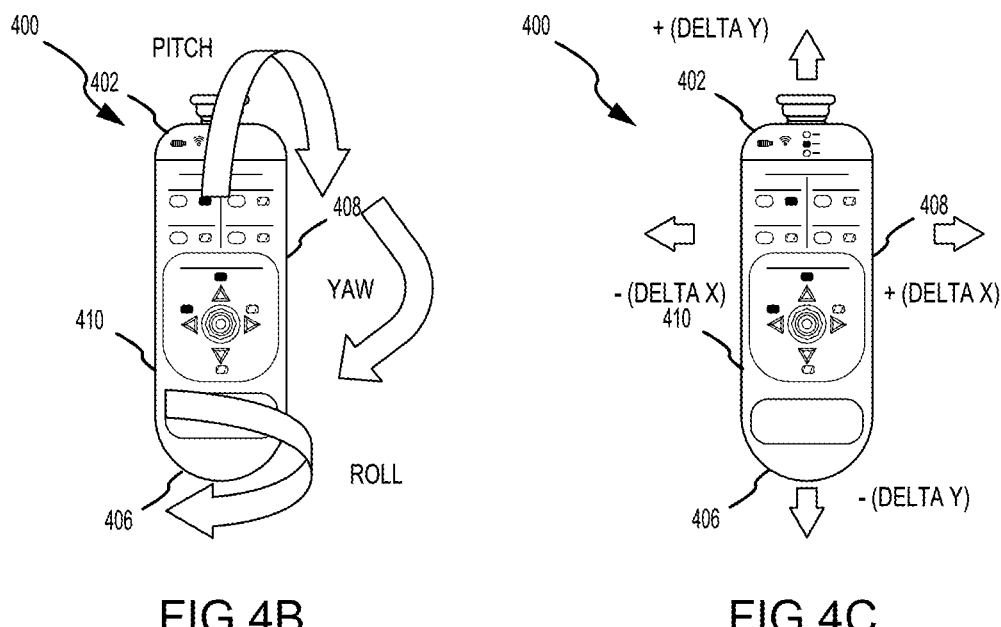
FIG.4B                                    FIG.4C

CALIBRATION FOR WIRELESS CARGO DEVICE RELATIVE ORIENTATION

FIELD

The present disclosure generally relates to the field of cargo handling systems and, more particularly, to establishing a frame of reference for a wireless cargo device relative to an orientation of a cargo compartment of an aircraft.

BACKGROUND

As technology is expanding in the cargo aircraft industry, wireless devices are becoming more ubiquitous. Numerous benefits have been identified with the addition of wireless cargo interfaces, one of them being the reduction of the number of operators that are needed to load and unload cargo. Operator reduction is achievable due to the ability for a single operator to position themselves freely wherever necessary during operations. However, when moving around the cargo compartment the orientation of the wireless device within the cargo compartment is constantly changing. This can cause the operator to be confused on which command is needed to move cargo in a particular direction given their current orientation.

SUMMARY

A mobile cargo controller for a cargo handling system is disclosed. The mobile cargo controller for a cargo handling system includes at least one inertial measurement unit configured to identify a true forward position of a cargo compartment in which the cargo handling system operates; determine an orientation of the mobile cargo controller; and, using the true forward position of the cargo compartment and the orientation of the mobile cargo controller, identify a frame of reference for the mobile cargo controller within the cargo compartment.

In various embodiments, the mobile cargo controller further includes a display. In various embodiments, the identification of the frame of reference for the mobile cargo controller within the cargo compartment is displayed on the display. In various embodiments, the identification of the true forward position of the cargo compartment is identified by a magnetometer associated with the cargo compartment. In various embodiments, the orientation of the mobile cargo controller is identified by a magnetometer in the mobile cargo controller. In various embodiments, the identification of the true forward position of the cargo compartment is received wireless from a fixed orientation panel within the cargo compartment.

In various embodiments, the identification of the true forward position of the cargo compartment is obtained by placing the mobile cargo controller in a molded pocket in the cargo compartment. In various embodiments, the molded pocket has a fixed orientation that identifies the true forward position of the cargo compartment. In various embodiments, the identification of the true forward position of the cargo compartment is obtained via wired or wireless communication from a device within the cargo compartment. In various embodiments, the device within the cargo compartment is a molded pocket.

Also disclosed herein is a cargo handling system. The cargo handling system includes a plurality of power drive units (PDUs) and a mobile cargo controller configured to control each of the plurality of PDUs. The mobile cargo controller includes at least one inertial measurement unit configured to identify a true forward position of a cargo compartment in which the cargo handling system operates; determine an orientation of the mobile cargo controller; and, using the true forward position of the cargo compartment and the orientation of the mobile cargo controller, identify a frame of reference for the mobile cargo controller within the cargo compartment.

In various embodiments, the mobile cargo controller further includes a display. In various embodiments, the identification of the frame of reference for the mobile cargo controller within the cargo compartment is displayed on the display. In various embodiments, the identification of the true forward position of the cargo compartment is received wireless from a fixed orientation panel within the cargo compartment. In various embodiments, the identification of the true forward position of the cargo compartment is obtained by placing the mobile cargo controller in a molded pocket in the cargo compartment. In various embodiments, the molded pocket has a fixed orientation that identifies the true forward position of the cargo compartment.

In various embodiments, the identification of the true forward position of the cargo compartment is obtained via wired or wireless communication from a device within the cargo compartment. In various embodiments, the device within the cargo compartment is a molded pocket.

Also disclosed herein is an aircraft. The aircraft includes a cargo deck and a cargo handling system disposed within the cargo deck. The cargo handling system includes a plurality of power drive units (PDUs) and a mobile cargo controller configured to control each of the plurality of PDUs. The mobile cargo controller includes at least one inertial measurement unit configured to identify a true forward position of a cargo compartment in which the cargo handling system operates; determine an orientation of the mobile cargo controller; and, using the true forward position of the cargo compartment and the orientation of the mobile cargo controller, identify a frame of reference for the mobile cargo controller within the cargo compartment.

In various embodiments, the mobile cargo controller further includes a display. In various embodiments, the identification of the frame of reference for the mobile cargo controller within the cargo compartment is displayed on the display. In various embodiments, the identification of the true forward position of the cargo compartment is received wireless from a fixed orientation panel within the cargo compartment. In various embodiments, the identification of the true forward position of the cargo compartment is obtained by placing the mobile cargo controller in a molded pocket in the cargo compartment and wherein the molded pocket has a fixed orientation that identifies the true forward position of the cargo compartment.

In various embodiments, the identification of the true forward position of the cargo compartment is obtained via wired or wireless communication from a device within the cargo compartment. In various embodiments, the device within the cargo compartment is a molded pocket.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 4B schematically illustrates orientation tracking of the mobile cargo controller of FIG. 4A using at least one inertial measurement unit, in accordance with various embodiments.

FIG. 4C schematically illustrates positional tracking of the mobile cargo controller of FIG. 4A using at least one inertial measurement unit, in accordance with various embodiments.

DETAILED DESCRIPTION

Figure 1A:
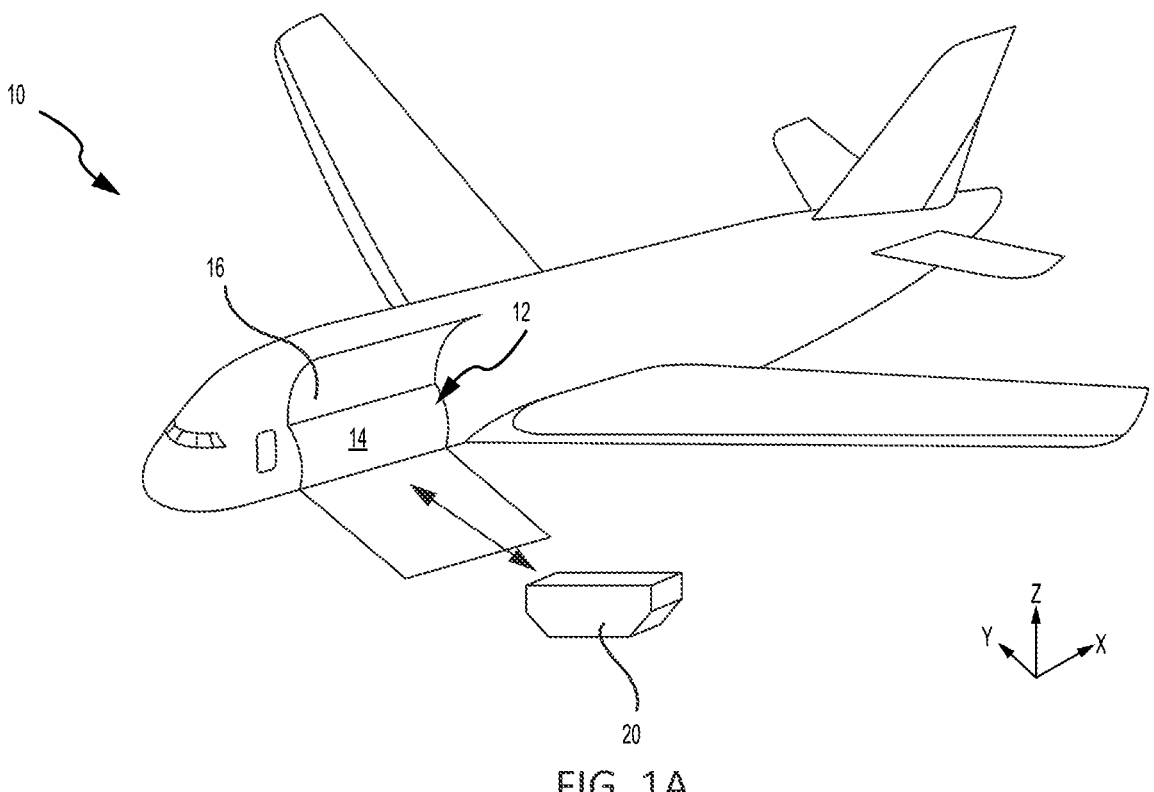
FIG. 1A illustrates a schematic view of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

When moving around a cargo compartment of an aircraft, an orientation of a mobile cargo controller within the cargo compartment is, in many instances, changing frequently. Such a change in the orientation of the mobile cargo controller may cause the operator to be confused on which command is necessary to move cargo in a particular direction given the operator's current orientation and/or the orientation of the mobile cargo controller. While typical systems may provide solutions for orientation and position, such system fail to include a determination of a frame of reference for orientation within the cargo environment.

Disclosed herein are systems and methods for establishing a frame of reference for wireless cargo device, hereinafter referred to as a mobile cargo controller, relative to an orientation of a cargo compartment of an aircraft. In various embodiments, establishing the frame of reference for the mobile cargo controller relative to the orientation of the cargo compartment of the aircraft may be achieved by utilizing a continuous comparison to a fixed device in the cargo compartment. In various embodiments, the fixed device measures orientation via an internal compass, i.e. a magnetometer. In various embodiments, the magnetometer of the fixed device within the cargo compartment is continuously compared with magnetometer measurements in the mobile cargo controller. In various embodiments, an embedded inertial measurement unit (IMU) sensor in the mobile cargo controller may be used to determine orientation. In various embodiments, establishing the frame of reference for the mobile cargo controller relative to the orientation of the cargo compartment of the aircraft may be achieved by calibrating at a fixed location within the cargo compartment, such as a docking station or molded pocket for the mobile cargo controller to fit into. In various embodiments, upon establishing a point of origin, the mobile cargo controller utilizes its internal IMU to track its orientation relative to the orientation of the cargo compartment of the aircraft.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
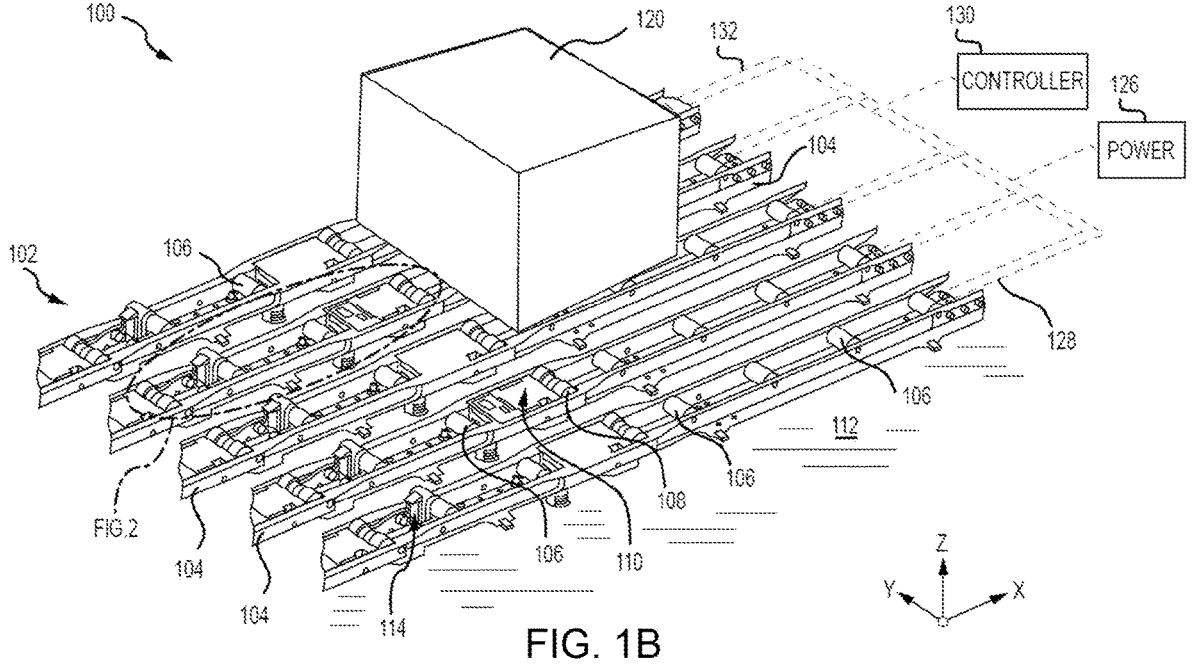
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or drive rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
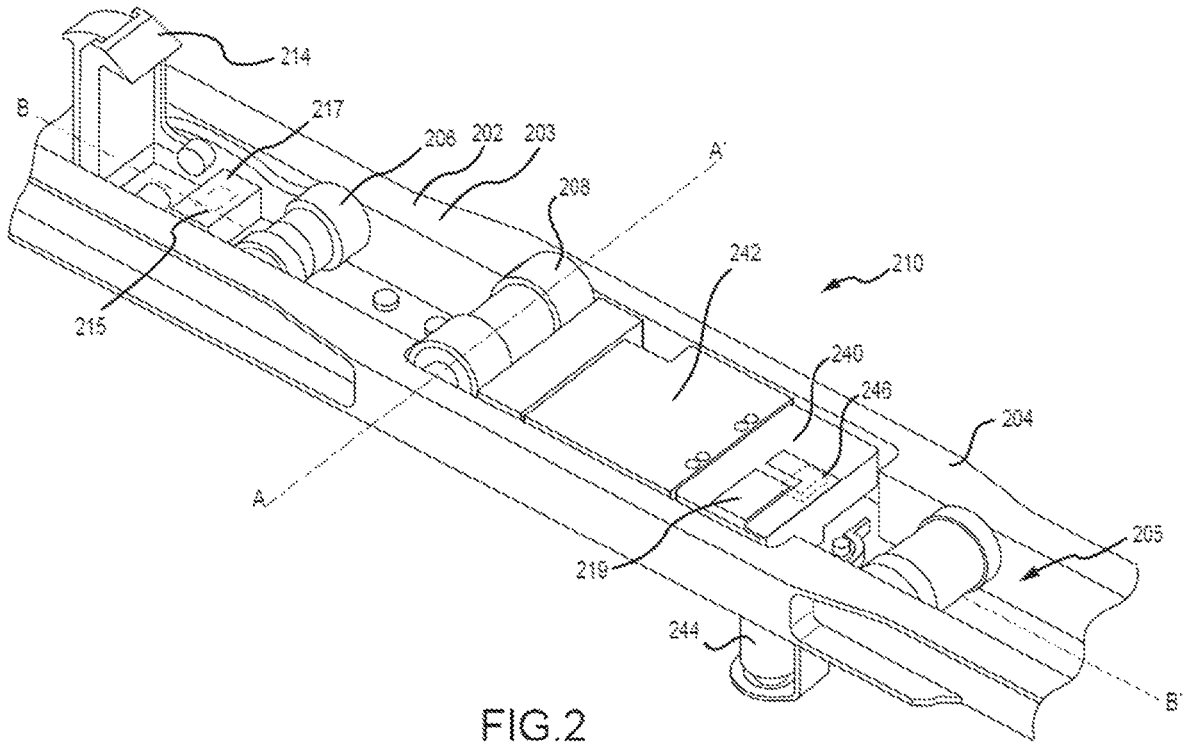
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
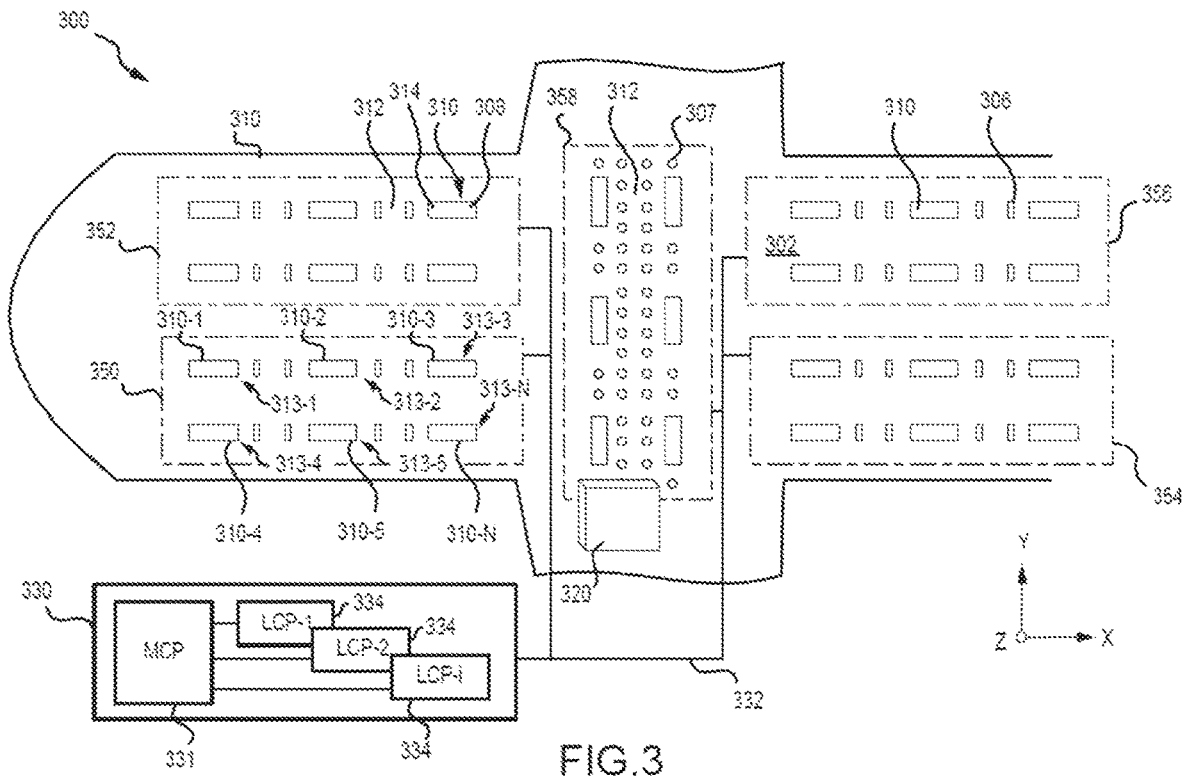
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port (left)-side section 350, the forward starboard (right)-side section 352, the aft port (left)-side section 354, and the aft starboard (right)-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 313-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward star-board-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4A:
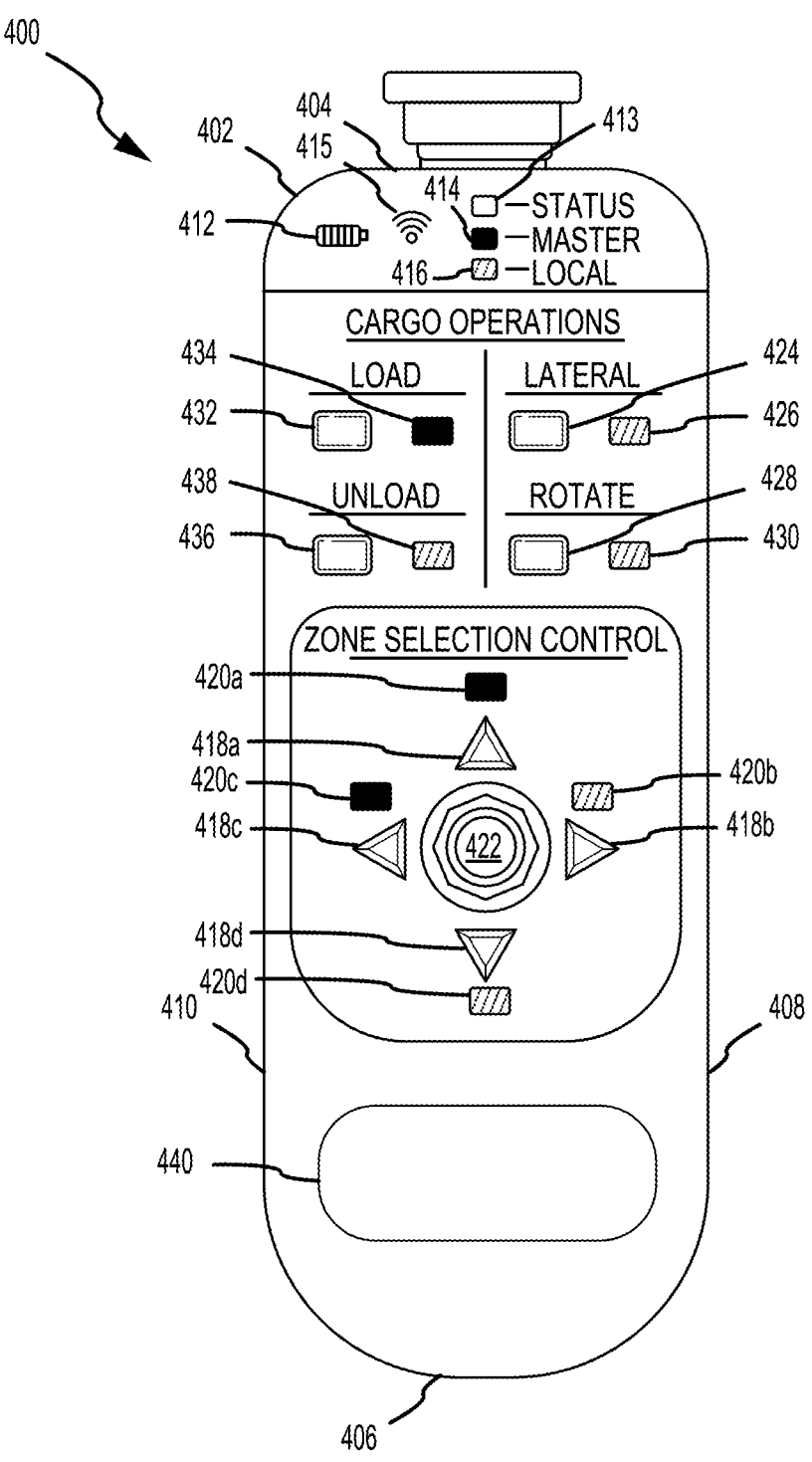
FIG. 4A illustrates a top/plan view of a mobile cargo controller, in accordance with various embodiments.

Referring to FIG. 4A, a mobile cargo controller for a cargo handling system is illustrated, in accordance with various embodiments. In various embodiments, the mobile cargo controller 400 is a hand-held device, may be of any appropriate size, shape, and/or configuration, and includes a housing 402. This housing 402 (or more generally the mobile cargo controller 400) includes a forward end 404, an aft or rear end 406 that is oppositely disposed from the forward end 404 in a longitudinal dimension for the mobile cargo controller 400, a right side 408, and a left side 410 that is oppositely disposed from the right side 408 in a lateral dimension for the mobile cargo controller 400. In various embodiments, the mobile cargo controller 400 also includes a battery indicator 412 (e.g., indicative of remaining battery power for the mobile cargo controller 400), a status indicator 413 (indicating, when activated, a status of the mobile cargo controller 400, such as active or inactive), a master control-ler indicator 414 (indicating, when activated, that the mobile cargo controller 400 is in a master control mode of a cargo handling system), a local controller indicator 416 (indicat-ing, when activated, that the mobile cargo controller 400 is in a local control mode of a cargo handling system), and a wireless connection indicator 415 (indicating, when acti-vated, that the mobile cargo controller 400 is in wireless communication with a master controller or a local controller, among others). In various embodiments, each of the indi-cators 412, 413, 414, 415, and 416 may be an activatable light source of any appropriate type, such as an LED.

In various embodiments, the mobile cargo controller 400 includes selectors for selecting a plurality of different cargo zones (four being illustrated, although the mobile cargo controller 400 may be configured for any appropriate num-ber of cargo zones). The noted cargo zone selectors include a cargo zone selector 418a, a cargo zone selector 418b, a cargo zone selector 418c, and a cargo zone selector 418d, with the cargo zone selectors 418a and 418c being oppo-sitely disposed and spaced in the longitudinal dimension of the mobile cargo controller 400, and with the cargo zone selectors 418b and 418d being oppositely disposed and spaced in the lateral dimension of the mobile cargo control-ler 400. The cargo zone selector 418a may be characterized as being associated with the forward end 404 of the mobile cargo controller 400; the cargo zone selector 418b may be characterized as being associated with the right side 408 of the mobile cargo controller 400; the cargo zone selector 418c may be characterized as being associated with the aft or rear end 406 of the mobile cargo controller 400; and the cargo zone selector 418d may be characterized as being associated with the left side 410 of the mobile cargo con-troller 400. Each cargo zone selector 418a-418d may be characterized as an actuator, for instance a button. One or more of the cargo zone selectors 418a-418d may be used to select a particular cargo zone or combination of cargo zones in a cargo compartment and in a manner that will be discussed in more detail below. One actuation of a given cargo zone selector 418a-418d may be for activation of the same, and a subsequent actuation of a given cargo zone selector 418a-418d may be for an inactivation of the same.

In various embodiments, the mobile cargo controller 400 includes a plurality of different cargo zone indicators. The noted cargo zone indicators include a cargo zone indicator 420a, a cargo zone indicator 420b, a cargo zone indicator 420c, and a cargo zone indicator 420d, with the cargo zone indicators 420a and 420c being oppositely disposed and spaced from one another in the longitudinal dimension of the mobile cargo controller 400, and with the cargo zone indi-cators 420b and 420d being oppositely disposed and spaced from one another in the lateral dimension for the mobile cargo controller 400. The cargo zone indicator 420a may be characterized as being associated with both the forward end 404 of the mobile cargo controller 400 and the cargo zone selector 418a; the cargo zone indicator 420b may be char-acterized as being associated with both the right side 408 of the mobile cargo controller 400 and the cargo zone selector 418b; the cargo zone indicator 420c may be characterized as being associated with both the aft or rear end 406 of the mobile cargo controller 400 and the cargo zone selector 418c; and the cargo zone indicator 420d may be character-ized as being associated with both the left side 410 of the mobile cargo controller 400 and the cargo zone selector 418d. Each cargo zone indicator 420a-420d may be an activatable light source of any appropriate, such as an LED.

In various embodiments, the cargo zone indicator 420a may be disposed in proximity to the cargo zone selector 418a and may be activated by actuation of the cargo zone selector 418b; the cargo zone indicator 420b may be dis-posed in proximity to the cargo zone selector 418b and may be activated by actuation of the cargo zone selector 418b; the cargo zone indicator 420c may be disposed in proximity to the cargo zone selector 418c and may be activated by actuation of the cargo zone selector 418c; and the cargo zone indicator 420d may be disposed in proximity to the cargo zone selector 418d and may be activated by actuation of the cargo zone selector 418d. As will be discussed in more detail below, an operator may actuate any one or more of the cargo zone selectors 418a-418d and with the mobile cargo con-troller 400 being in a certain orientation at the time of this activation (and that will activate the corresponding cargo zone indicator(s) 420a-420d). It may be that two of the cargo zone selectors 418a-418d will be actuated to select a par-ticular cargo zone. The cargo zone selectors 418a-418d that are initially activated will be in relation to the direction that the forward end 404 of the mobile cargo controller 400 is facing (and presumably the operator), and again will activate the corresponding cargo zone indicator(s) 420a-420d. If the mobile cargo controller 400 is moved and now "points" in a different direction (e.g., the forward end 404 is now facing in a different direction), the activated cargo zone indicator(s) 420a-420d will change accordingly—the active/selected cargo zone(s) will be presented on the mobile cargo controller 400 (by activation of the relevant cargo zone indicator (s) 420a-420d) in relation to the direction that the forward end 404 of the mobile cargo controller 400 is facing (and presumably the operator).

In various embodiments, the mobile cargo controller 400 further includes a cargo motion controller 422, which may be in the form of a joystick, and that may provide at least one of proportional directional and/or proportional velocity control. The cargo zone selectors 418a-418d may be collectively disposed about the cargo motion controller 422, as may the cargo zone indicators 420a-420d. In various embodiments, other components of the mobile cargo controller 400 include the following, and will be discussed in more detail below with regard to use/operation of the mobile cargo controller 400: 1) a cargo lateral movement selector 424 (e.g., an actuator; a button); 2) a cargo lateral movement indicator 426; 3) a cargo rotation selector 428 (e.g., an actuator; a button); 4) a cargo rotation indicator 430; 5) a load operation selector 432 (e.g., an actuator; a button); 6) a loading operation indicator 434; 7) an unload operation selector 436 (e.g., an actuator; a button); and 8) an unload operation indicator 438. Each of the indicators 426, 430, 434, and 438 may be a light source of any appropriate type, such as an LED.

In various embodiments, the mobile cargo controller 400 includes a display 440 that indicates a direction of the forward end 404 of the mobile cargo controller 400 relative to relative to an orientation of a cargo compartment, such as cargo compartment 14 of FIG. 1A. In various embodiments, establishing the frame of reference for the mobile cargo controller 400 relative to the orientation of the cargo compartment may be achieved by utilizing a continuous comparison to a fixed device in the cargo compartment. In various embodiments, the fixed device measures orientation via an internal compass, i.e. a magnetometer. In various embodiments, the magnetometer of the fixed device within the cargo compartment is continuously or at short intervals compared with magnetometer measurements in the mobile cargo controller 400. In various embodiments, an embedded inertial measurement unit (IMU) sensor in the mobile cargo controller 400 may be used to determine the orientation. In various embodiments, establishing the frame of reference for the mobile cargo controller 400 relative to the orientation of the cargo compartment may be achieved by calibrating at a fixed location within the cargo compartment, such as a docking station or molded pocket for the mobile cargo controller 400 to fit into. In various embodiments, upon establishing a point of origin, the mobile cargo controller 400 utilizes its internal IMU to track its orientation relative to the orientation of the cargo compartment.

Figure 4D:
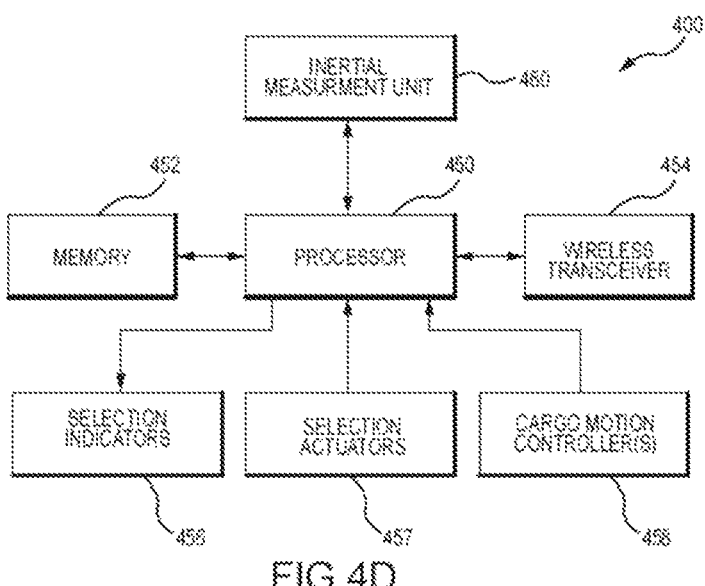
FIG. 4D is a functional schematic of the mobile cargo controller of FIG. 4A, in accordance with various embodiments.

In that regard, in various embodiments, the mobile cargo controller 400 includes at least one inertial measurement unit (IMU). FIG. 4B schematically illustrates IMU orientation tracking for the mobile cargo controller 400, in accordance with various embodiments, while FIG. 4C schematically illustrates IMU positional tracking for the mobile cargo controller 400, in accordance with various embodiments. A functional schematic of the mobile cargo controller 400 is illustrated in FIG. 4D, in accordance with various embodiments. The mobile cargo controller 400 includes one or more processors 450 and that may utilize any appropriate processing arrangement/architecture, memory 452, a wireless transceiver 454, a plurality of selection indicators 456 (e.g., cargo zone indicators 420a-420d; cargo lateral movement indicator 426; cargo rotation indicator 430; loading operation indicator 434; unload operation selector 436; unload operation indicator 438), a plurality of selection actuators 457 (e.g., cargo zone selectors 418a-418d; cargo lateral movement selector 424; cargo rotation selector 428; load operation selector 432), one or cargo motion controllers 458 (e.g., cargo motion controller 422), and one or more inertial measurement units 460.

Figure 4E:
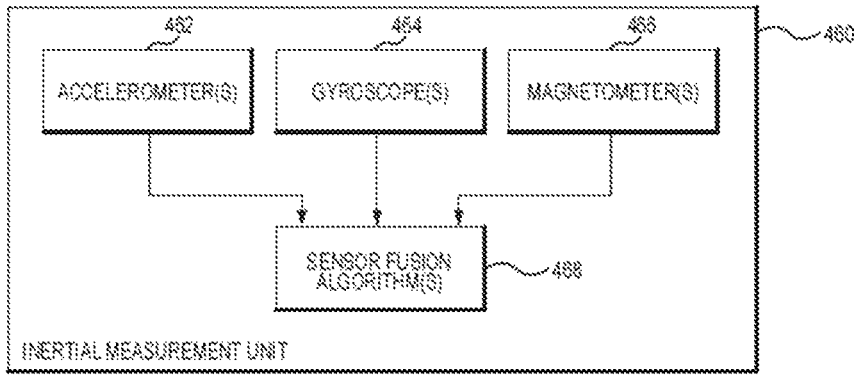
FIG. 4E is a functional schematic of an inertial measurement unit used by the mobile cargo controller of FIG. 4A, in accordance with various embodiments.

FIG. 4E is a functional schematic of an inertial measurement unit (IMU) 460 that may be used by the mobile cargo controller 400, in accordance with various embodiments. In various embodiments, the IMU 460 includes one or more accelerometers 462, one or more gyroscopes 464, and optionally one or more magnetometers 466. Output from these sensors 462, 464, and 466 may be output to and used by one or more sensor fusion algorithms 468 to determine the orientation of the mobile cargo controller 400 in space. The IMU(s) 460 used by the mobile cargo controller 400 can also be used to determine when the mobile cargo controller 400 has been dropped (e.g., via detecting a sudden change in position and orientation). Such a detected drop may be used to at least temporarily deactivate the current cargo operation (e.g., an ongoing operation of the cargo motion controller 422).

In various embodiments, memory 452 is configured to store information used in running the mobile cargo controller 400. In various embodiments, memory 452 comprises a computer-readable storage medium, which, in various embodiments, includes a non-transitory storage medium. In various embodiments, the term "non-transitory" indicates that the memory 452 is not embodied in a carrier wave or a propagated signal. In various embodiments, the non-transitory storage medium stores data that, over time, changes (e.g., such as in a random access memory (RAM) or a cache memory). In various embodiments, memory 452 comprises a temporary memory. In various embodiments, memory 452 comprises a volatile memory. In various embodiments, the volatile memory includes one or more of RAM, dynamic RAM (DRAM), static RAM (SRAM), and/or other forms of volatile memories. In various embodiments, memory 452 is configured to store computer program instructions for execution by the one or more processors 450. In various embodiments, applications and/or software running on mobile cargo controller 400 utilize(s) memory 452 in order to temporarily store information used during program execution. In various embodiments, memory 452 includes one or more computer-readable storage media. In various embodiments, memory 452 is configured to store larger amounts of information than volatile memory. In various embodiments, memory 452 is configured for longer-term storage of information. In various embodiments, memory 452 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, the one or more processors 450 is configured to implement functionality and/or process instructions. In various embodiments, the one or more processors 450 is configured to process computer instructions stored in memory 452. In various embodiments, the one or more processors 450 includes one or more of a microprocessor, a controller, a digital signal processor (DSP), an application specific integrated circuit (ASIC), a field-programmable gate array (FPGA), or other equivalent discrete or integrated logic circuitry.

System program instructions and/or processor instructions may be loaded onto memory 452. The system program instructions and/or processor instructions may, in response to execution by operator, cause the one or more processors 450 to perform various operations. In particular, and as described in further detail below, the instructions may allow the one or more processors 450 to determine the orientation of the mobile cargo controller 400. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, responsive to the operator moving around the cargo compartment, an orientation of a mobile cargo controller within the cargo compartment is likely changing frequently. In various embodiments, such a change in the orientation of the mobile cargo controller may cause the operator to be confused on which command is needed to move cargo in a particular direction given the operator's current orientation and/or the orientation of the mobile cargo controller.

Figures 5A, 5B:
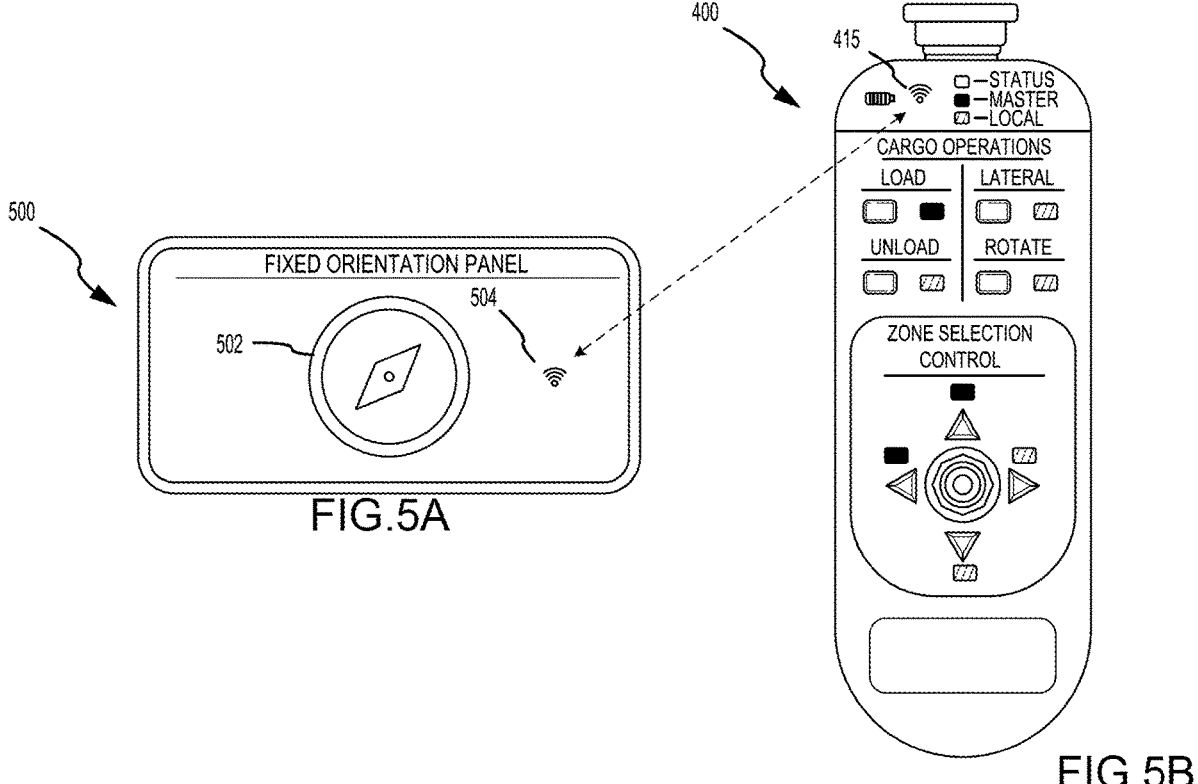
FIGS. 5A and 5B illustrate a fixed orientation panel within a cargo compartment and a mobile cargo controller, in accordance with various embodiments.

FIGS. 5A and 5B illustrate a fixed orientation panel within a cargo compartment (e.g., for an aircraft) and a mobile cargo controller, in accordance with various embodiments. In various embodiments, in order to establish a frame of reference for the mobile cargo controller, fixed orientation panel 500 may be provided within the cargo compartment, such as cargo compartment 14 of FIG. 1A. In various embodiments, fixed orientation panel includes a magnetometer 502 that measures magnetic field or magnetic dipole moment and, more specifically, information regarding the orientation of the cargo compartment. In various embodiments, the x attribute of the magnetometer 502 represents the magnetic field around X-axis. In various embodiments, the y attribute of the magnetometer 502 represents the magnetic field around Y-axis. In various embodiments, the z attribute of the magnetometer 502 represents the magnetic field around Z-axis. With regard to the cargo compartment, the magnetometer 502 may identify the true forward position, i.e. a front of the aircraft, of the cargo compartment. In various embodiments, when the mobile cargo controller 400 is powered on, the mobile cargo controller 400 wirelessly connects to the magnetometer 502, which may be indicated by wireless connection indicator 415 on the mobile cargo controller 400 and wireless connection indicator 504 on the magnetometer 502. Once connected, magnetometer angles measured the magnetometer 502 may be continuously or at short intervals compared the one or more magnetometers, such as one or more magnetometers 466 of FIG. 4E, in the mobile cargo controller 400. In that regard, in various embodiments, the true forward position of the cargo compartment is continuously broadcast to the mobile cargo controller 400, which may then be indicated to the operator via display 440. Accordingly, in various embodiments, a difference in the readings between the fixed orientation panel 500 in the cargo compartment and the mobile cargo controller 400 provides a continuous sense of direction that is respective of the cargo compartment.

Figure 6:
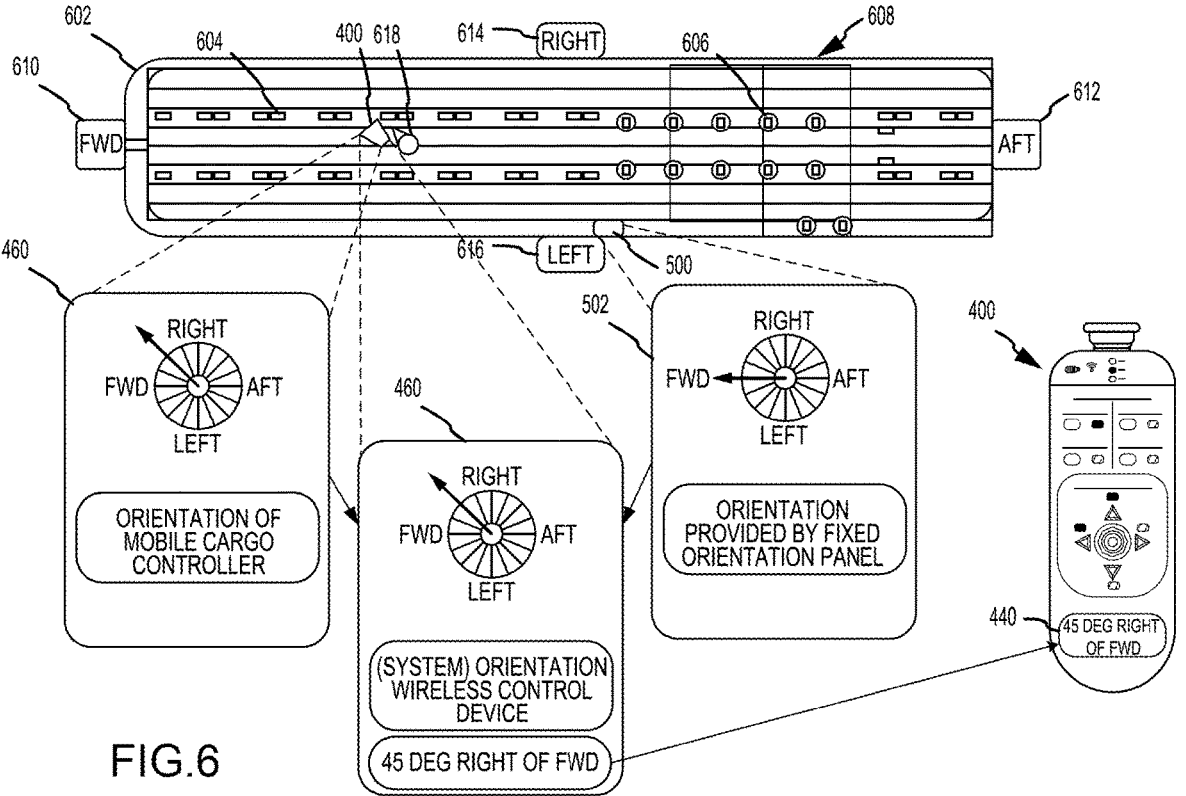
FIG. 6 illustrates a mobile cargo controller in relation to a representative cargo compartment, in accordance with various embodiments.

FIG. 6 illustrates a mobile cargo controller in relation to a representative cargo compartment (e.g., for an aircraft), in accordance with various embodiments. The deck of the cargo compartment 602 may include a plurality of PDUs 604 (e.g., for advancing cargo along an at least generally axial/linear path), as well as a plurality of freighter common turntables or FCTs 606 that are a specific type of PDU (having the ability to axially advance associated cargo, as well as to rotate associated cargo). The FCTs 606 are disposed in a doorway zone 608 of the cargo compartment 602. The cargo compartment 602 is defined by a forward end 610, an aft or rear end 612 that is spaced from the forward end 610 along a length (or longitudinal) dimension of the cargo compartment 602, a right side 614, and a left side 616 that is spaced from the right side 614 along a width (or lateral) dimension of the cargo compartment 602.

Continuing to refer to FIG. 6, in various embodiments, the magnetometer 502 within the fixed orientation panel 500 in the cargo compartment 602 provides an orientation identifying the true forward position of the cargo compartment 602. In various embodiments, the inertial measurement unit (IMU) 460 within the mobile cargo controller 400 in the cargo compartment 602 provides an orientation identifying the direction that the forward end 404 of the mobile cargo controller 400, held by operator 618, is facing, projecting, or pointing in FIG. 6 (hereafter "pointing" alone may be used with regard to the forward end 404 of the mobile cargo controller 400). In various embodiments, upon receiving the true forward position of the cargo compartment 602 and identifying the direction that the forward end 404 of the mobile cargo controller 400 is pointing, the IMU 460 identifies, with reference to the illustration in FIG. 6, that the mobile cargo controller 400 is pointing 45 degrees right of forward. In various embodiments, the IMU 460 provides this identification to the operator 618 via display 440, which then provides the operator 618 a frame of reference for the mobile cargo controller 400 relative to the orientation of the cargo compartment 602. In various embodiments, establishing this frame of reference for the mobile cargo controller 400 relative to the orientation of the cargo compartment 602 may be continuously performed during the loading, unloading, or maintenance of the cargo compartment 602.

Figure 7A:
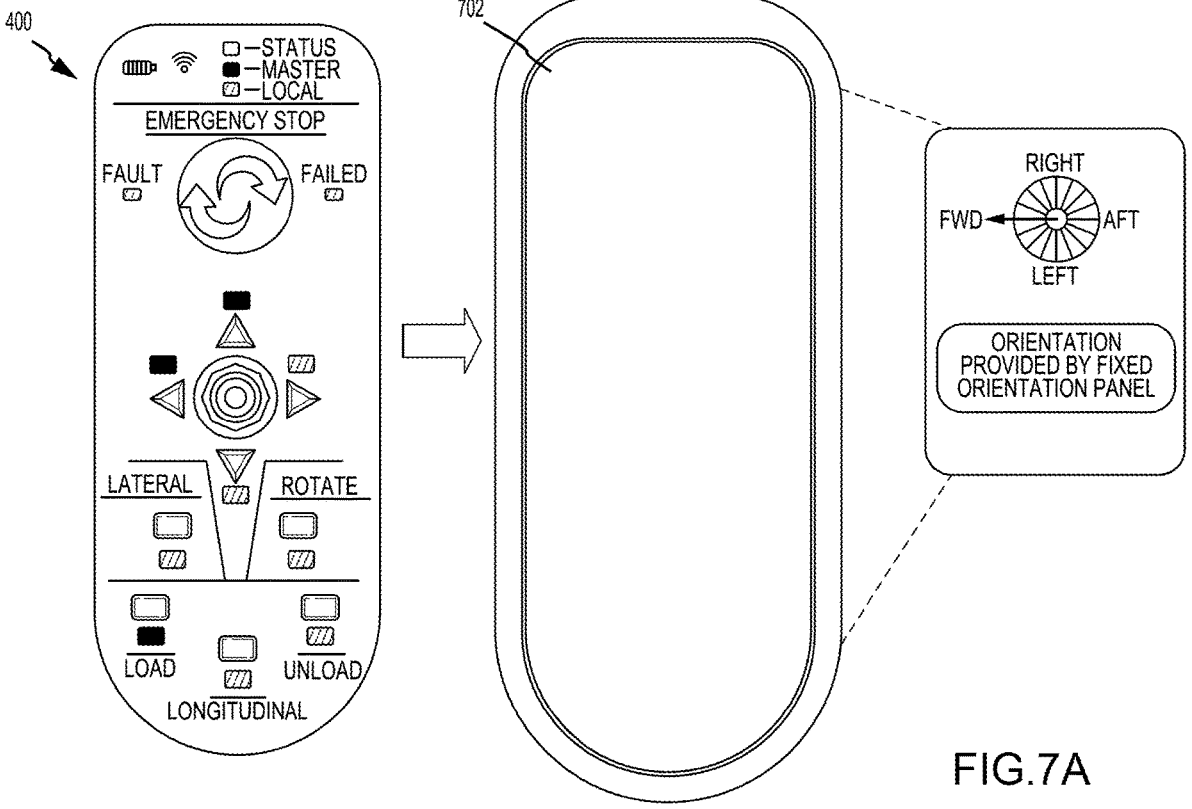
FIGS. 7A and 7B illustrate a molded pocket with which a mobile cargo controller calibrates with to obtain a frame of reference for the mobile cargo controller relative to an orientation of a cargo compartment, in accordance with various embodiments.
Figure 7B:
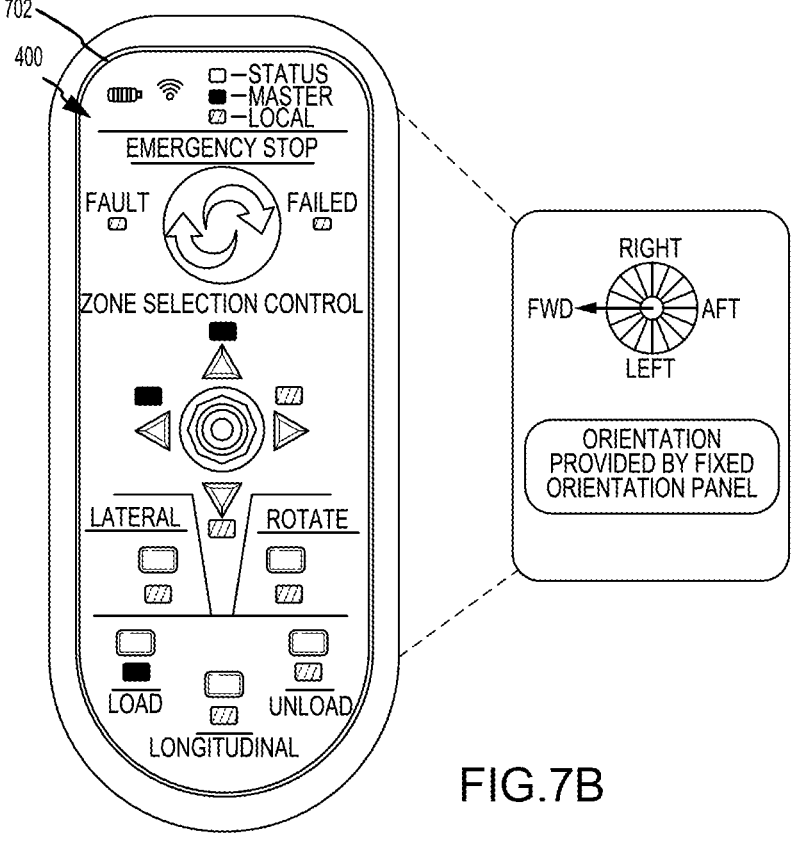

FIGS. 7A and 7B illustrate a molded pocket with which a mobile cargo controller calibrates with to obtain a frame of reference for the mobile cargo controller relative to an orientation of a cargo compartment (e.g., for an aircraft), in accordance with various embodiments. In various embodiments, using a known starting location that is fixed in orientation, with respect to the cargo compartment, provides the mobile cargo controller 400 to obtain a frame of reference relative to an orientation of a cargo compartment and utilize this frame of reference as a basis of direction as the mobile cargo controller 400 tracks its own movement, i.e. changes in orientation and positions, as the operator holding the mobile cargo controller 400 moves through the cargo compartment. In various embodiments, molded pocket 702 that is shaped such that the mobile cargo controller 400 will only fit in a specified orientation within the molded pocket 702 is mounted at a location within the cargo compartment. In various embodiments, the molded pocket 702 has a fixed orientation that identifies the true forward position, i.e. a front of the aircraft, of the cargo compartment. In various embodiments, the operator places the mobile cargo controller 400 into the molded pocket 702 and the inertial measurement unit (IMU) in the mobile cargo controller 400 initializes a calibration sequence that identifies the fixed orientation of the molded pocket identifying the true forward position of the cargo compartment. In various embodiments, after calibration with the molded pocket 702, the mobile cargo controller 400 identifies a frame of reference relative to an orientation of a cargo compartment and utilizes this frame of reference as a basis of direction as the mobile cargo controller 400 tracks its own movement, i.e. changes in orientation and positions, as the operator holding the mobile cargo controller 400 moves through the cargo compartment.

Figure 8A:
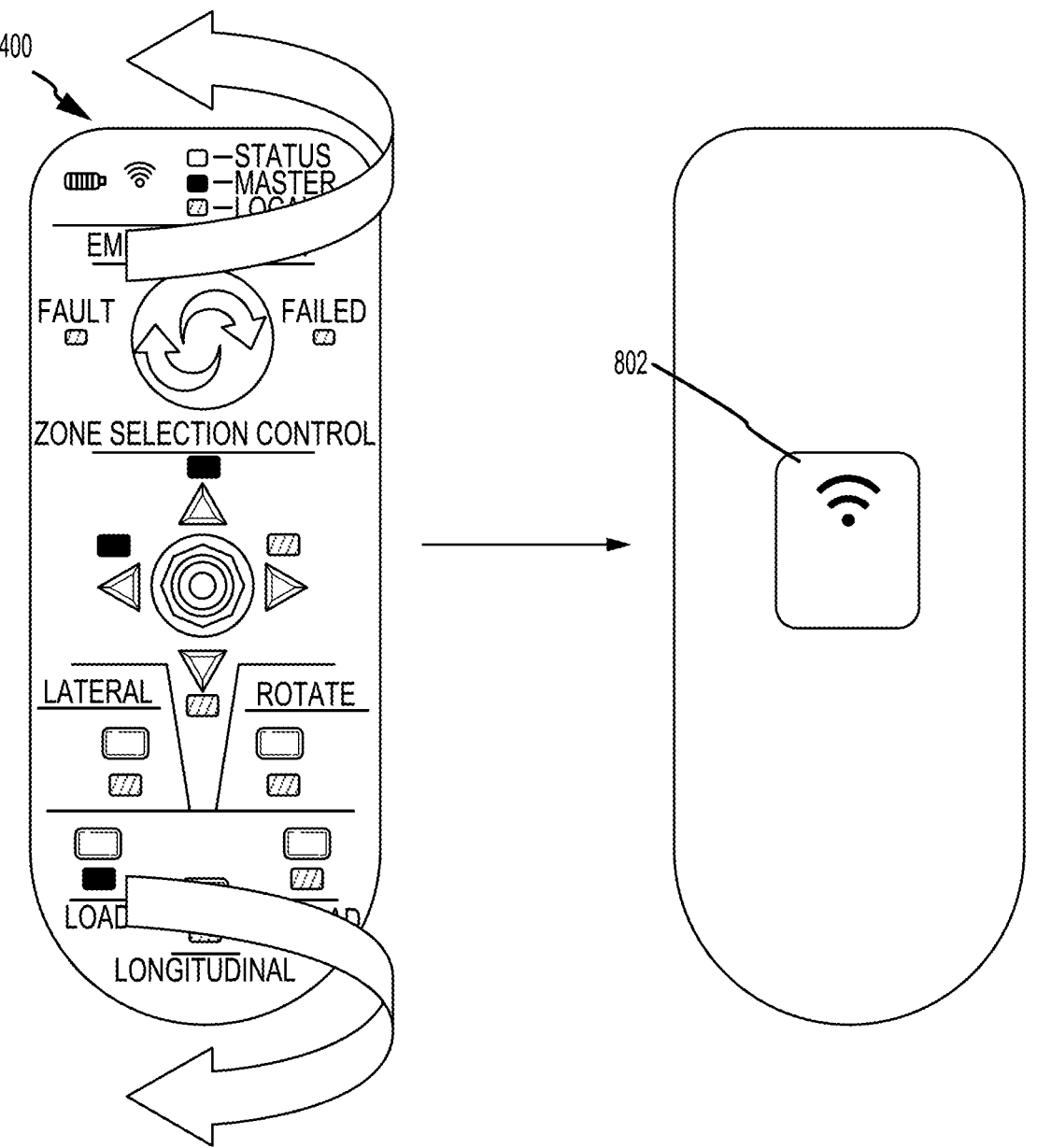
FIGS. 8A and 8B illustrate a molded pocket, configured with wireless communication capability, with which a mobile cargo controller, also configured with wireless communication capability, calibrates with to obtain a frame of reference for the mobile cargo controller relative to an orientation of a cargo compartment, in accordance with various embodiments.
Figure 8B:
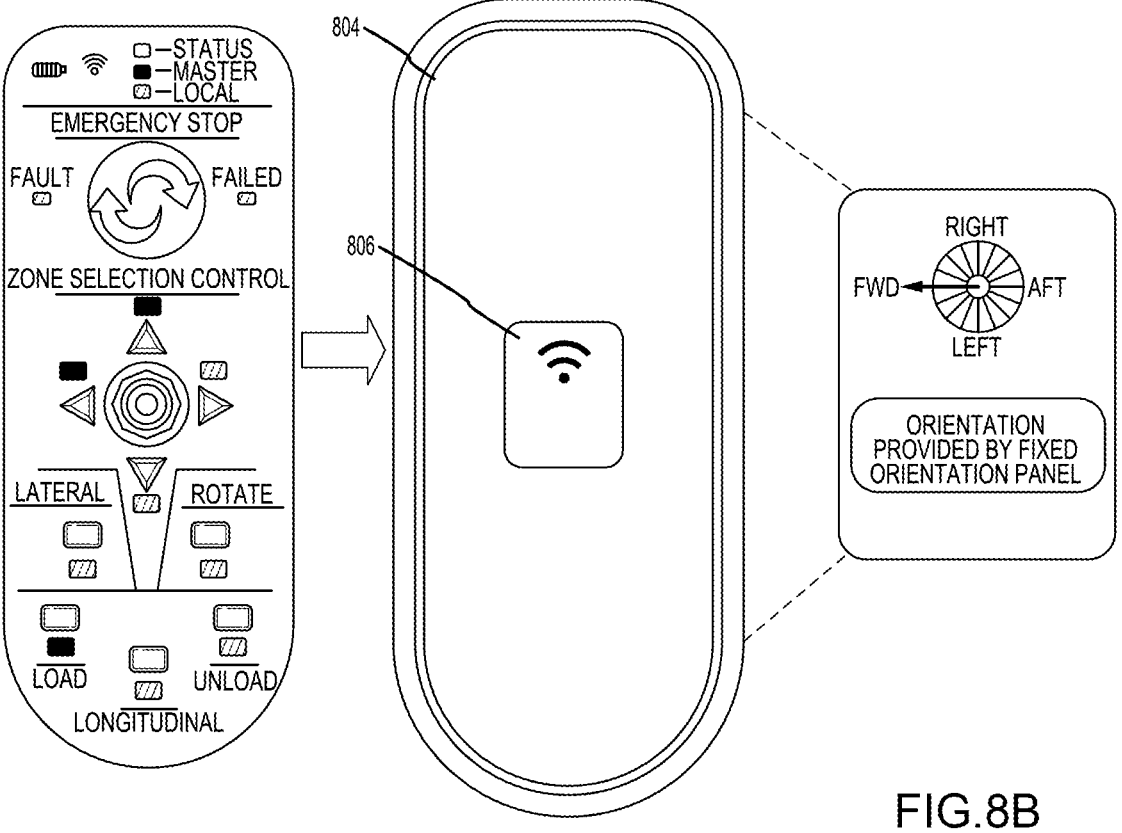

FIGS. 8A and 8B illustrate a molded pocket, configured with wireless communication capability, with which a mobile cargo controller, also configured with wireless communication capability, calibrates with to obtain a frame of reference for the mobile cargo controller relative to an orientation of a cargo compartment (e.g., for an aircraft), in accordance with various embodiments. In various embodiments, the wireless communication capability may be near field communication (NFC), Bluetooth, Wi-Fi, Radio Frequency Identification (RFID), or QR code, among others. In various embodiments, using a known starting location that is fixed in orientation within the aircraft, with respect to the cargo compartment, provides the mobile cargo controller 400 to obtain a frame of reference relative to an orientation of a cargo compartment and utilize this frame of reference as a basis of direction as the mobile cargo controller 400 tracks its own movement, i.e. changes in orientation and positions, as the operator holding the mobile cargo controller 400 moves through the cargo compartment. In various embodiments, the mobile cargo controller 400 may be configured with wireless communication circuitry 802. In various embodiments, the wireless communication circuitry 802 allows for the mobile cargo controller 400 to pass information to and receive information identifying a frame of reference relative to an orientation of a cargo compartment. In that regard, when the mobile cargo controller 400 is within range of molded pocket 804, the wireless communication circuitry 802 may request an identification of the true forward position of the cargo compartment and receive the true forward position of the cargo compartment. In various embodiment the wireless communication circuitry 802 may operate at a frequency, for example 13.5 MHZ, and has transmission ranges of approximately 4 cm (approximately 1.575 inches) or less, thereby allowing the mobile cargo controller 400 to communicate with the molded pocket 804 over wireless communication.

In that regard, in various embodiments, the molded pocket 804 is shaped such that the mobile cargo controller 400 will fits within the molded pocket 804 at a location within the cargo compartment. In various embodiments, the molded pocket 804 has a fixed orientation that identifies the true forward position of the cargo compartment. In various embodiments, the molded pocket 804 is further configured with wireless communication circuitry 806. In various embodiments, the wireless communication circuitry 806 allows for the molded pocket 804 to pass information to and receive information in order to identify a frame of reference relative to an orientation of a cargo compartment. Accordingly, in various embodiments, the operator places the mobile cargo controller 400 into the molded pocket 804 and the inertial measurement unit (IMU) received information via wireless communication circuitry 802, 806 that identifies the true forward position of the cargo compartment. In various embodiments, after calibration with the molded pocket 804, the mobile cargo controller 400 identifies a frame of reference relative to an orientation of a cargo compartment and utilizes this frame of reference as a basis of direction as the mobile cargo controller 400 tracks its own movement, i.e. changes in orientation and positions, as the operator holding the mobile cargo controller 400 moves through the cargo compartment.

In addition to the embodiments of FIGS. 8A and 8B, in various embodiments, the device within the cargo compartment may be a molded pocket configured with a hardline connection such as with pogo pins or contacts, among others. In that regard, in various embodiments, the identification of the true forward position of the cargo compartment may be obtained via wired or wireless communication.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mobile cargo controller for a cargo handling system, comprising:

at least one inertial measurement unit configured to:

identify a true forward position of a cargo compartment in which the cargo handling system operates, wherein the identification of the true forward position of the cargo compartment is obtained by placing the mobile cargo controller in a molded pocket in the cargo compartment and wherein the molded pocket has a fixed orientation that identifies the true forward position of the cargo compartment;

determine an orientation of the mobile cargo controller; and using the true forward position of the cargo compartment and the orientation of the mobile cargo controller, identify a frame of reference for the mobile cargo controller within the cargo compartment.

2. The mobile cargo controller of claim 1, further comprising:

a display, wherein the identification of the frame of reference for the mobile cargo controller within the cargo compartment is displayed on the display.

3. The mobile cargo controller of claim 1, wherein the identification of the true forward position of the cargo compartment is identified by a magnetometer associated with the cargo compartment.

4. The mobile cargo controller of claim 1, wherein the orientation of the mobile cargo controller is identified by a magnetometer in the mobile cargo controller.

5. The mobile cargo controller of claim 1, wherein the identification of the true forward position of the cargo compartment is received wireless from a fixed orientation panel within the cargo compartment.

6. A cargo handling system, comprising:

a plurality of power drive units (PDUs); and a mobile cargo controller configured to control each of the plurality of PDUs, wherein the mobile cargo controller comprises:

at least one inertial measurement unit configured to:

identify a true forward position of a cargo compartment in which the cargo handling system operates, wherein the identification of the true forward position of the cargo compartment is obtained by placing the mobile cargo controller in a molded pocket in the cargo compartment and wherein the molded pocket has a fixed orientation that identifies the true forward position of the cargo compartment;

determine an orientation of the mobile cargo controller; and using the true forward position of the cargo compartment and the orientation of the mobile cargo controller, identify a frame of reference for the mobile cargo controller within the cargo compartment.

7. The cargo handling system of claim 6, wherein the mobile cargo controller further comprises:

a display, wherein the identification of the frame of reference for the mobile cargo controller within the cargo compartment is displayed on the display.

8. The cargo handling system of claim 6, wherein the identification of the true forward position of the cargo compartment is received wireless from a fixed orientation panel within the cargo compartment.

9. An aircraft, comprising:

a cargo deck; and a cargo handling system disposed within the cargo deck, the cargo handling system comprising:

a plurality of power drive units (PDUs); and a mobile cargo controller configured to control each of the plurality of PDUs, wherein the mobile cargo controller comprises:

at least one inertial measurement unit configured to:

identify a true forward position of a cargo compartment in which the cargo handling system operates, wherein the identification of the true forward position of the cargo compartment is obtained by placing the mobile cargo controller in a molded pocket in the cargo compartment and wherein the molded pocket has a fixed orientation that identifies the true forward position of the cargo compartment;

determine an orientation of the mobile cargo controller; and using the true forward position of the cargo compartment and the orientation of the mobile cargo controller, identify a frame of reference for the mobile cargo controller within the cargo compartment.

10. The aircraft of claim 9, wherein the mobile cargo controller further comprises:

a display, wherein the identification of the frame of reference for the mobile cargo controller within the cargo compartment is displayed on the display.

11. The aircraft of claim 9, wherein the identification of the true forward position of the cargo compartment is received wireless from a fixed orientation panel within the cargo compartment.

* * * * *